(12) United States Patent
Zheng et al.

(10) Patent No.: US 12,147,884 B2
(45) Date of Patent: Nov. 19, 2024

(54) FEATURE PRUNING AND ALGORITHM SELECTION FOR MACHINE LEARNING

(71) Applicant: Intuit Inc., Mountain View, CA (US)

(72) Inventors: Hao Zheng, Sunnyvale, CA (US); Lin Tao, Fremont, CA (US); Jianxiang Chang, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 830 days.

(21) Appl. No.: 17/243,547

(22) Filed: Apr. 28, 2021

(65) Prior Publication Data
US 2022/0351087 A1  Nov. 3, 2022

(51) Int. Cl.
*G06N 20/20* (2019.01)
*G06N 5/04* (2023.01)

(52) U.S. Cl.
CPC ............... *G06N 20/20* (2019.01); *G06N 5/04* (2013.01)

(58) Field of Classification Search
CPC ........... G06N 20/20; G06N 5/04; G06N 20/00
See application file for complete search history.

(56) References Cited

U.S. PATENT DOCUMENTS

| | | | |
|---|---|---|---|
| 2017/0278135 A1* | 9/2017 | Majumdar | G06V 40/10 |
| 2020/0125961 A1* | 4/2020 | Agrawal | G06N 20/00 |
| 2022/0209381 A1* | 6/2022 | Chen | H01P 1/2002 |
| 2022/0309381 A1 | 9/2022 | Goldsteen et al. | |

OTHER PUBLICATIONS

Understanding Black-box Predictions via Influence Functions; presented at Proceedings of the 34th International Conference on Machine Learning; Sydney, Australia; 2017; 11 pages.*

* cited by examiner

*Primary Examiner* — Pei Yong Weng
(74) *Attorney, Agent, or Firm* — Paradice & Li LLP

(57) ABSTRACT

This disclosure provides systems, methods and apparatuses for machine learning. In some implementations, a pre-processing system may identify one or more special features in an input dataset and may generate one or more pruned datasets, respectively, based on the identified special features. The pre-processing system maps each of the pruned datasets to one or more predictions and selectively removes the values associated with one or more special features from the input dataset based on the mapping. In some other implementations, a pre-processing system may map each of the feature sets in an input dataset to multiple predictions in accordance with multiple machine learning algorithms. The pre-processing system evaluates a performance of each of the mappings and selects one of the machine learning algorithms to be used to train the machine learning model based on the performance of each mapping.

18 Claims, 9 Drawing Sheets

FEATURE PRUNING AND ALGORITHM SELECTION FOR MACHINE LEARNING

TECHNICAL FIELD

This disclosure relates generally to machine learning, and specifically to feature pruning and algorithm selection for the training of machine learning models.

DESCRIPTION OF RELATED ART

Machine learning is a technique for improving the ability of a computer system or application to perform a certain task. Machine learning can be broken down into two component parts: training and inferencing. During the training phase, a machine learning system is provided with one or more "answers" and a large volume of raw data to be mapped to each answer. For example, a machine learning system may be trained to predict a potential car buyer's preference for electric cars. During the training phase, the machine learning system may be provided with a large number of features associated with previous car buyers (such as name, age, gender, height, weight, home address, income, credit score, and the like) and an indication of whether the previous car buyers had purchased electric cars. The machine learning system may analyze the raw data to learn a set of rules (also referred to as a "model") that can be used to describe an electric car buyer. For example, the system may perform statistical analyses on the features associated with the previous car buyers to determine a common set of features (and attributes) associated with electric car buyers.

During the inferencing phase, the machine learning model can be used to predict or infer whether a future car buyer will purchase an electric car. For example, a set of features associated with the future car buyer may be provided as inputs to the machine learning model, and the machine learning model may output a prediction (or inference) indicating whether that car buyer will purchase an electric car. The accuracy of the prediction may depend on various parameters associated with the training of the machine learning model. For example, models trained on higher quality input datasets are generally more robust than models trained on smaller input datasets. However, the size of the input dataset affects the cost of the training operation as well as the size of the resulting model. For example, training performed on a large input dataset can consume significant time and resources while producing a machine learning model that is often large and inefficient to deploy.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method of machine learning. In some implementations, the method may include steps of receiving a dataset including a plurality of values for training a machine learning model, where each of the plurality of values is associated with one of a plurality of features; determining, for each of the plurality of features, one or more characteristics of the values associated with the feature; identifying a first special feature of the plurality of features based on the determined characteristics for each of the plurality of features; selecting a first subset of values of the plurality of values that excludes the values associated with the first special feature; performing a first mapping of the first subset of values to one or more first predictions in accordance with a first machine learning algorithm; and selectively removing, from the dataset, the values associated with the first special feature based at least in part on the one or more first predictions.

Another innovative aspect of the subject matter described in this disclosure can be implemented in a machine learning system. The machine learning system may include one or more processors and a memory storing instructions for execution by the one or more processors. In some implementations, execution of the instructions causes the scheduling system to perform operations including receiving a dataset including a plurality of values for training a machine learning model, where each of the plurality of values is associated with one of a plurality of features; determining, for each of the plurality of features, one or more characteristics of the values associated with the feature; identifying a first special feature of the plurality of features based on the determined characteristics for each of the plurality of features; selecting a first subset of values of the plurality of values that excludes the values associated with the first special feature; performing a first mapping of the first subset of values to one or more first predictions in accordance with a first machine learning algorithm; and selectively removing, from the dataset, the values associated with the first special feature based at least in part on the one or more first predictions.

Another innovative aspect of the subject matter described in this disclosure can be implemented as a method of machine learning. In some implementations, the method may include steps of receiving a dataset including a plurality of values for training a machine learning model, where each of the plurality of values is associated with one of a plurality of features; performing a first mapping of one or more of the plurality of values to one or more first predictions in accordance with a first machine learning algorithm; determining one or more first performance scores based on the one or more first predictions, where the one or more first performance scores indicate a performance of the first mapping according to one or more evaluation metrics; performing a second mapping of one or more of the plurality of values to one or more second predictions in accordance with a second machine learning algorithm; determining one or more second performance scores based on the one or more second predictions, where the one or more second performance scores indicate a performance of the second mapping according to the one or more evaluation metrics; comparing the one or more first performance scores with the one or more second performance scores; and training the machine learning model in accordance with the first machine learning algorithm or the second machine learning algorithm based on the comparison of the first performance scores with the second performance scores.

BRIEF DESCRIPTION OF THE DRAWINGS

The example implementations are illustrated by way of example and are not intended to be limited by the figures of the accompanying drawings. Like numbers reference like elements throughout the drawings and specification.

DETAILED DESCRIPTION

Figure 1:
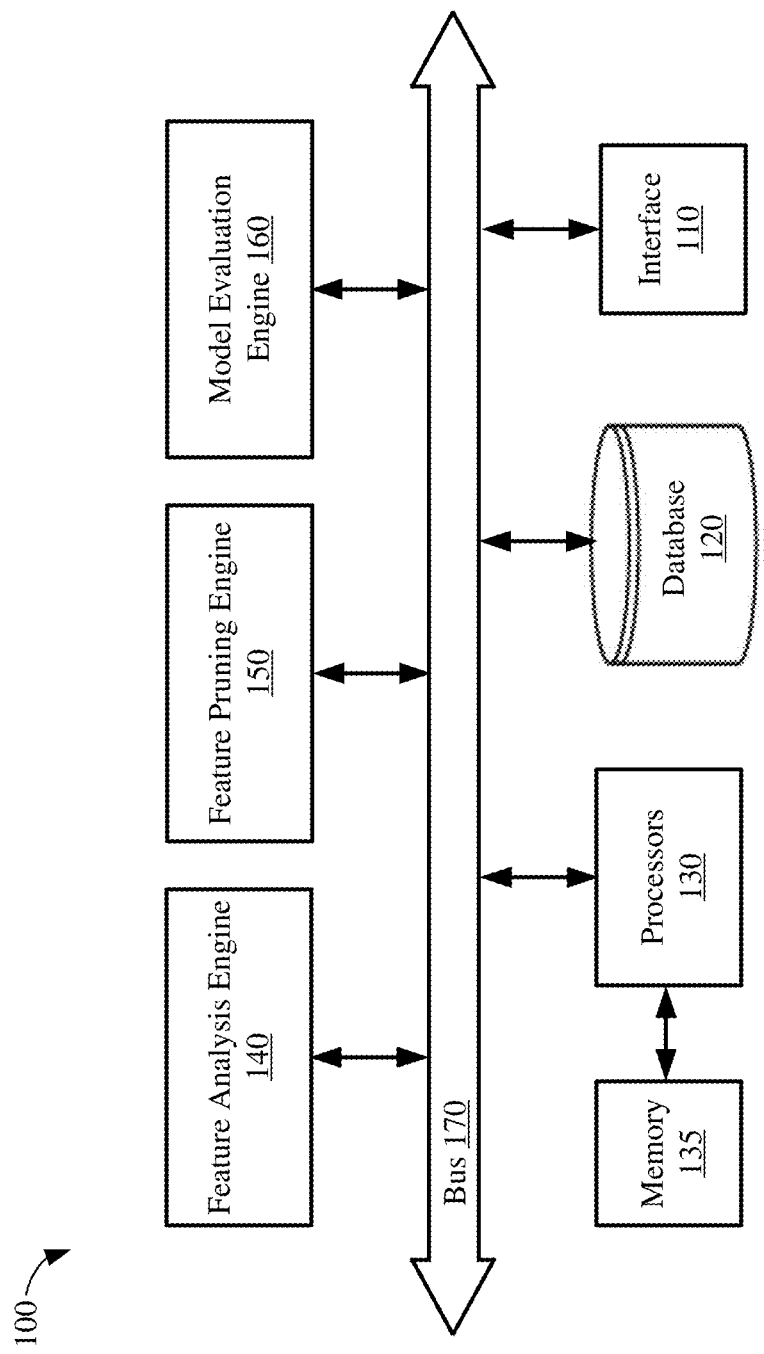
FIG. 1 shows an example pre-processing system for machine learning, according to some implementations.

Implementations of the subject matter described in this disclosure may be used to train machine learning models. As described above, a machine learning model can be used to map a set of features to one or more predictions (or inferences). As used herein, the term "feature" refers to a category or class of data and the term "feature set" refers to a set of values (or subset of data) associated with a given feature. The accuracy of the prediction may depend on various parameters associated with the training of the machine learning model such as, for example, the size of the input dataset, the quality of the input dataset, and the machine learning algorithm used to train the model. Example machine learning algorithms include, but are not limited to, logistic regression, decision tree, random forests, extreme gradient boosting (XGBoost), and neural networks. Aspects of the present disclosure recognize that some machine learning algorithms may be more suitable than others for mapping a given set of features to one or more predictions. Aspects of the present disclosure also recognize that some features in a given dataset may be more important or deterministic than others. Thus, careful feature pruning and algorithm selection prior to the training phase may result in a more optimized machine learning model.

In some implementations, a pre-processing system may identify one or more special features in an input dataset and may generate one or more pruned datasets, respectively, based on the identified special features. As used herein, the term "special feature" may refer to any feature that is unlikely to improve the training of a machine learning model. Example special features may include, but are not limited to, constant features (where each value in the feature set is the same), quasi-constant features (where many of the values in the feature set are the same), duplicate features (where the values in the feature set are identical to the values in another feature set), correlated features (where the values in the feature set are correlated with the values in another feature set), and other less important features. Each of the pruned datasets consists of the remaining values of the input dataset excluding the values associated with a respective special feature. The pre-processing system maps each of the pruned datasets to one or more predictions and selectively removes the values associated with one or more special features from the input dataset based on the mapping. For example, the pre-processing system may evaluate a performance of each mapping and may remove the values associated with a special feature if the mapping of the pruned dataset excluding such values exceeds a threshold performance level.

In some other implementations, a pre-processing system may map each of the feature sets in an input dataset to multiple predictions in accordance with multiple machine learning algorithms. For example, the pre-processing system may map the values in the input dataset to one or more first predictions in accordance with a first machine learning algorithm (such as logistic regression) and may additionally map the values to one or more second predictions in accordance with a second machine learning algorithm (such as random forests). The pre-processing system evaluates a performance of each of the mappings and selects one of the machine learning algorithms to be used to train the machine learning model based on the performance of each mapping. For example, if the mapping of the values to the first predictions performs better than the mapping of the values to the second predictions, the pre-processing system may select the first machine learning algorithm for the training of the machine learning model. Conversely, if the mapping of the values to the second predictions performs better than the mapping of the values to the first predictions, the pre-processing system may select the second machine learning algorithm for the training of the machine learning model.

Various implementations of the subject matter disclosed herein provide one or more technical solutions to the technical problem of training machine learning models. More specifically, various aspects of the present disclosure provide a unique computing solution to a unique computing problem that did not exist prior to electronic systems and services that implement machine learning. By identifying special features in an input dataset and pruning the dataset based on the special features, the subject matter disclosed herein provide meaningful improvements to the performance of machine learning systems, and more specifically to reducing the cost of training a machine learning model as well as reducing the size and complexity, while also improving the accuracy, of the resulting model. The reduced model size can also reduce the cost of inferencing during deployment. By mapping an input dataset to multiple predictions in accordance with multiple machine learning algorithms and selecting one of the machine learning algorithms to be used to train a machine learning model based on the predictions, the subject matter disclosed herein provide meaningful improvements to the performance of machine learning systems, and more specifically to improving the performance of machine learning models. As such, implementations of the subject matter disclosed herein are not an abstract idea such as organizing human activity or a mental process that can be performed in the human mind.

Moreover, various aspects of the present disclosure effect an improvement in the technical field of machine learning. Analyzing the characteristics of large datasets (such as required to train a machine learning model), much less mapping such large datasets to a prediction or inference in accordance with various machine learning algorithms, cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

FIG. 1 shows an example pre-processing system 100 for machine learning, according to some implementations. Although described herein with respect to pruning an input dataset and selecting a machine learning algorithm, various aspects of the pre-processing system 100 disclosed herein may be generally applicable for training machine learning models. Specifically, by analyzing the characteristics of each feature in an input dataset and identifying special features based on the characteristics, aspects of the present disclosure may provide insights about the contributions of each feature to the training of a particular machine learning model. In some aspects, such insights may be used to train a new machine learning model. For example, the pre-processing system 100 may remove unimportant features from the input dataset or select an optimal machine learning algorithm to be used in the training. In some other aspects, such insights may be used to draw inferences about new features or datasets. For example, as new data arrives in a machine learning pipeline, the pre-processing system 100 may filter any unimportant features that would otherwise be used to train a new machine learning model (thereby avoiding unnecessary costs associated with the training process).

The pre-processing system 100 is shown to include an input/output (I/O) interface 110, a database 120, one or more data processors 130, a memory 135 coupled to the data processors 130, a feature analysis engine 140, a feature pruning engine 150, and a model evaluation engine 160. In some implementations, the various components of the pre-processing system 100 may be interconnected by at least a data bus 170, as depicted in the example of FIG. 1. In some other implementations, the various components of the pre-processing system 100 may be interconnected using other suitable signal routing resources.

The interface 110 may include a screen, an input device, and other suitable elements that allow a user, resource, or other electronic system (not shown for simplicity) to provide information to the pre-processing system 100 or to retrieve information from the pre-processing system 100. Example information that can be provided by to the pre-processing system 100 may include various types of data or feature sets that can be used to train a machine learning model. Example information that can be retrieved from the pre-processing system 100 may include a pruned dataset (such as a subset of the data provided to the pre-processing system 100), an indication of a machine learning algorithm to be used to train a machine learning model, or one or more performance indicators associated with various combinations of pruning strategies and machine learning algorithms.

The database 120, which may represent any suitable number of databases, may store any suitable information pertaining to datasets to be pruned by the pre-processing system 100, the special features to be identified by the pre-processing system 100, and the machine learning algorithms to be selected by the pre-processing system 100. For example, the information may include an input dataset that can be used to train a machine learning model, predictions that can be inferred from the dataset, machine learning algorithms that can be used to map the dataset to the predictions, evaluation metrics that can be used to evaluate the performance of the mappings, evaluation parameters that can be used to interpret the evaluation results, and special feature parameters that can be used to identify the special features. In some implementations, the database 120 may be a relational database capable of presenting the data sets to a user in tabular form and capable of manipulating the data sets using relational operators. In some aspects, the database 120 may use Structured Query Language (SQL) for querying and maintaining the database.

The data processors 130, which may be used for general data processing operations (such as manipulating the datasets stored in the database 120), may be one or more suitable processors capable of executing scripts or instructions of one or more software programs stored in the machine learning system 100 (such as within the memory 135). The data processors 130 may be implemented with a general-purpose single-chip or multi-chip processor, a graphics processing unit (GPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The feature analysis engine 140 may be used for analyzing one or more characteristics of each feature set associated with the input dataset. For example, the values in the input dataset may be associated with one or more features. As used herein, the term "feature" refers to a category or class of data and the term "feature set" refers to the set of values associated with a given feature. In some aspects, the one or more characteristics may include one or more statistics associated with the values in each feature set. Example statistics may include, but are not limited to, a number of non-null values, a number of distinct values, a predominant value, a number of instances of the predominant value, a standard deviation, a mean value, a minimum value, a maximum value, one or more percentile thresholds, a univariate receiver operating characteristic (ROC) area under curve (AUC) score, and an extreme gradient boosting (XGBoost) importance score. In some other aspects, the one or more characteristics may include a data type (such as string, Boolean, integer, or float) associated with the values in each feature set. Thus, some features may have numerical values (referred to herein as "numerical features") and some features may have non-numerical values (referred to herein as "non-numerical features").

Table 1 shows an example input dataset that can be used for training a machine learning model to predict whether a car buyer will purchase an electric vehicle (EV). More specifically, the dataset includes a number of entries associated with previous car buyers. Each entry indicates the name, age, gender, height, and weight of the car buyer, the city in which the car buyer resides, the location in which the car buyer purchased the car, whether the car buyer possessed a driver's license (DL), and whether the car buyer purchased an EV. Each column of Table 1 represents a different feature set. Thus, the features associated with the dataset include "name," "age," "gender," "height," "weight," "residence," "location," "DL," and "EV." More specifically, the "name," "gender," "residence," and "location" feature sets include string values, the "DL" and "EV" feature sets include Boolean values, the "age" and "weight" feature sets include integer values, and the "height" feature set includes floating point values.

TABLE 1

| Name | Age | Gender | Height | Weight | Residence | Location | DL | EV |
| --- | --- | --- | --- | --- | --- | --- | --- | --- |
| Owen | 22 | Male | 1.71 | 71 | New York | New York | Yes | No |
| Florence | 38 | Female | 1.61 | 52 | San Francisco | San Francisco | Yes | Yes |
| Laina | 26 | Female | 1.60 | 58 | Los Angeles | Los Angeles | Yes | Yes |
| Lily | 35 | Female | 1.60 | 52 | Phoenix | Phoenix | Yes | Yes |
| William | 35 | Male | 1.77 | 80 | Philadelphia | Philadelphia | Yes | No |
| ☐ | ☐ | ☐ | ☐ | ☐ | ☐ | ☐ | ☐ | ☐ |
| Elisabeth | 27 | Female | 1.58 | 44 | San Jose | San Jose | Yes | Yes |
| Timothy | 54 | Male | 1.83 | 90 | Houston | Houston | Yes | No |
| Mary | 55 | Female | 1.52 | 39 | Dallas | Dallas | Yes | Yes |
| Emelia | 31 | Female | 1.49 | 42 | Chicago | Chicago | Yes | No |
| Selma | 38 | Female | 1.50 | 41 | San Diego | San Diego | Yes | Yes |

The feature pruning engine 150 may be used for generating one or more pruned datasets based on the characteristics of each feature set. In some implementations, the feature pruning engine 150 may identify one or more special features among the features in the dataset. As used herein, the term "special feature" may refer to any feature that is unlikely to improve the training of a machine learning model. In some aspects, the special features may include one or more constant features. A constant feature is defined as any feature set in which all the values are the same or identical. With reference for example to Table 1, the feature pruning engine 150 may identify "DL" as a constant feature. In some other aspects, the special features may include one or more quasi-constant features. A quasi-constant feature is defined as any feature set in which a threshold number of values are the same or identical. For example, the threshold may be defined or otherwise indicated by one or more special feature parameters stored in the database 120. With reference for example to Table 1, the feature pruning engine 150 may identify "gender" as a quasi-constant feature (because most of the values are female).

In some aspects, the special features may include one or more duplicate features. A duplicate feature is defined as any feature set in which the values are identical to the values in another feature set. With reference for example to Table 1, the feature pruning engine 150 may identify "residence" and "location" as duplicate features. In some other aspects, the special features may include one or more correlated features. A correlated feature is defined as any feature set in which the values are correlated with the values in another feature set. For example, the correlation between any two feature sets may be determined based on a Pearson correlation coefficient (PCC). A pair of feature sets are determined to be correlated if the PCC associated with the feature sets exceeds a threshold value, which may be defined or otherwise indicated by one or more special feature parameters stored in the database 120. With reference for example to Table 1, the feature pruning engine 150 may identify "height" and "weight" as correlated features.

Still further, in some aspects, the special features may include one or more unimportant or less important numerical features. The importance of a feature may depend on its contribution to the performance of a machine learning model, as evaluated based on a univariate ROC AUC score. A less important numerical feature is defined as any numerical feature set that contributes very little (if at all) to the performance of a machine learning model. As such, the ROC AUC score associated with the mapping of a numerical feature set to one or more predictions may indicate the importance of the numerical feature set. For example, numerical features associated with higher ROC AUC scores may be more important than numerical features associated with lower ROC AUC scores. In some implementations, the feature pruning engine 150 may classify a numerical feature as less important if its ROC AUC score is below a threshold score. For example, the threshold may be defined or otherwise indicated by one or more special feature parameters stored in the database 120.

In some implementations, the feature pruning engine 150 may generate each pruned dataset by removing the values associated with one or more of the identified special features. More specifically, the pruned dataset associated with a particular special feature may exclude the values associated with that special feature. Aspects of the present disclosure recognize that because there is no variance among the values associated with a constant feature, the predictive value of a constant feature (or quasi-constant feature) is likely very low. Thus, in some aspects, the feature pruning engine 150 may generate a pruned dataset based on constant features by removing, from the input dataset, any feature sets associated with constant features. With reference for example to Table 1, a pruned dataset based on constant features may exclude the "DL" feature set. In some other aspects, the feature pruning engine 150 may generate a pruned dataset based on a quasi-constant feature by removing, from the input dataset, any feature sets associated with quasi-constant features. With reference for example to Table 1, a pruned dataset based on quasi-constant features may exclude the "gender" feature set.

Aspects of the present disclosure also recognize that because duplicate features are identical, retaining both feature sets in the input dataset may increase the cost and complexity of the training operation without improving the performance of the machine learning model. In other words, the predictions inferred from the values associated with a first duplicate feature may be identical to the predictions inferred from the values associated with a second duplicate feature (assuming the feature sets associated with the first and second duplicate features are identical). Thus, the values associated with at least one of the duplicate features may be removed from the input dataset without affecting the performance of the machine learning mode. In some aspects, the feature pruning engine 150 may generate a pruned dataset based on duplicate features by retaining, in the input dataset, only one of the feature sets associated with the duplicate features. With reference for example to Table 1, a pruned dataset based on duplicate features may exclude the "residence" feature set. Alternatively, a pruned dataset based on duplicate features may exclude the "location" feature set.

Still further, in some aspects, the feature pruning engine 150 may generate a pruned dataset based on correlated features by removing, from the input dataset, any feature sets associated with correlated features that are determined to be less important. As described above, the importance of a feature may depend on its contribution to the performance of a machine learning model. A less important correlated feature is defined as any correlated feature that contributes very little (if at all) to the performance of a machine learning model. In some implementations, the feature pruning engine 150 may classify a correlated feature as less important if its ROC AUC score is below a threshold score. For example, the threshold may be defined or otherwise indicated by one or more special feature parameters stored in the database 120. In some other aspects, the feature pruning engine 150 may generate a pruned dataset based on less important numerical features by removing, from the input dataset, any feature sets associated with less important numerical features.

The model evaluation engine 160 may be used for evaluating the performance of one or more machine learning models. For example, the performance of a machine learning model may be evaluated according to one or more evaluation (or performance) metrics. Example suitable evaluation metrics include, but are not limited to, precision, recall, F1 score, and ROC AUC. To evaluate the performance of a machine learning model, the model evaluation engine 160 may provide one or more values of the input dataset as inputs to the machine learning model. The machine learning model maps the one or more values to one or more predictions, and the model valuation engine 160 may analyze the one or more predictions to determine a performance score associated with the mapping. For example, the performance score may indicate an accuracy of the predictions. Aspects of the present disclosure recognize that different evaluation metrics may measure different aspects of the performance of a machine learning model. Thus, in some aspects, the model evaluation engine 150 may score a machine learning model in accordance with multiple evaluation metrics. As such, the model evaluation engine 150 may determine a respective performance score according to each evaluation metric.

In some implementations, the model evaluation engine 160 may select an optimal machine learning algorithm to be used to train a new machine learning model. Example machine learning algorithms include, but are not limited to, logistic regression, decision tree, random forests, extreme gradient boosting (XGBoost), and neural networks. As described above, some machine learning algorithms may be more suitable than others for mapping a given set of values to one or more predictions (such as based on cost, complexity, and accuracy). Thus, in some aspects, the model evaluation engine 160 may provide one or more values of the input dataset as inputs to multiple machine learning models based on different machine learning algorithms. The model evaluation engine 160 may then evaluate the performance of each of the machine learning models (such as described above) and select one or more of the machine learning models with the highest performance scores. The machine learning algorithms implemented by the selected machine learning models may be identified as the optimal machine learning algorithms for training a new machine learning model.

In some other implementations, the model evaluation engine 160 may select one or more pruning strategies to be used to prune the input dataset. As described above, the pruning operation removes one or more feature sets from the input dataset that contribute little (if at all) to the performance of a machine learning model. In some aspects, the model evaluation engine 160 may provide each of the pruned datasets (generated by the feature pruning engine 150) as inputs to an existing machine learning model. The model evaluation engine 160 may then evaluate the performance of the existing machine learning model (such as described above) on each of the pruned datasets and select one or more of the pruned datasets associated with performance scores that are above one or more performance thresholds. For example, the performance thresholds may be defined or otherwise indicated by one or more evaluation parameters stored in the database 120. The model evaluation engine 160 may identify the special features associated with the selected pruned datasets and remove, from the input dataset, the feature sets associated with the identified special features.

The particular architecture of the pre-processing system 100 shown in FIG. 1 is but one example of a variety of different architectures within which aspects of the present disclosure may be implemented. For example, in some other implementations, the feature analysis engine 140 may be replaced by feature characteristic information stored as data in the database 120. In some other implementations, the machine learning system 100 may not include a feature pruning engine 150, the functions of which may be implemented by the processors 130 executing corresponding instructions or scripts stored in the memory 135. Still further, in some implementations, the functions of the model evaluation engine 160 may be performed by the processors 130 executing corresponding instructions or scripts stored in the memory 135.

Figure 2:
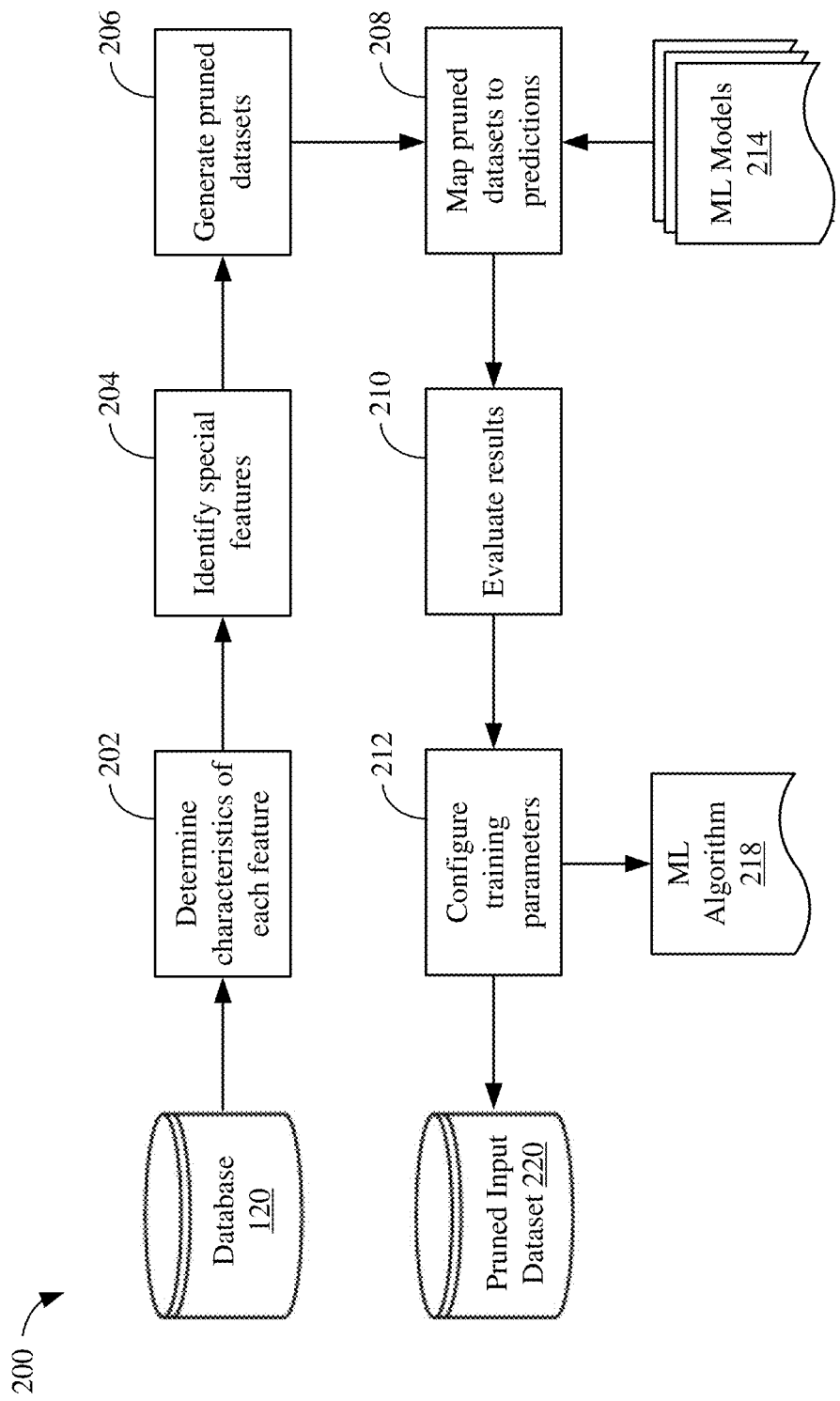
FIG. 2 shows an example process flow that may be employed by the pre-processing system of FIG. 1, according to some implementations.

FIG. 2 shows a high-level overview of an example process flow 200 that may be employed by the pre-processing system 100 of FIG. 1. More specifically, the process flow 200 depicts an example operation for pruning an input dataset and selecting a machine learning algorithm to be used for training a machine learning model. For example, the input dataset may be retrieved from the database 120. As described with reference to Table 1, each value in the dataset may be associated with a particular feature.

At block 202, a set of characteristics is determined for each feature in the dataset. In some implementations, the feature analysis engine 140 may analyze the values in each feature set to determine a respective set of characteristics for that feature set. Example characteristics may include, but are not limited to, a data type, a number of non-null values, a number of distinct values, a predominant value, a number of instances of the predominant value, a standard deviation, a mean value, a minimum value, a maximum value, one or more percentile thresholds, a univariate ROC AUC score, and an XGBoost score. In some aspects, the dataset may include one or more numerical features (such as "age," "height," and "weight" in Table 1). In some other aspects, the dataset may include one or more non-numerical features (such as "name," "gender," "residence," "location," "DL," and "EV" in Table 1).

Figure 3A:
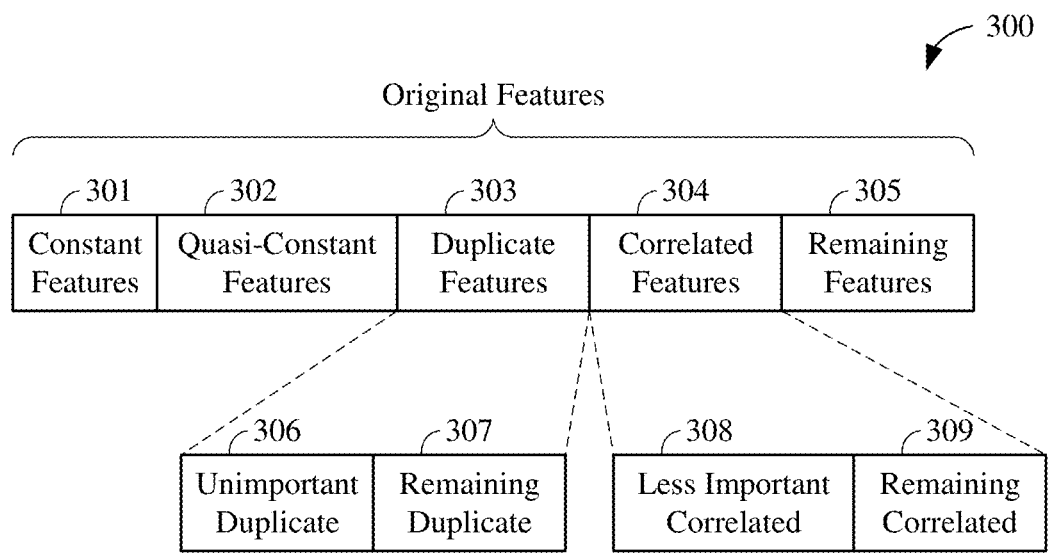
FIG. 3A shows an example grouping of original features in a dataset, according to some implementations.

At block 204, one or more special features are identified in the dataset. In some implementations, the feature pruning engine 150 may classify each feature in the dataset as a special feature or a "remaining feature" based on the characteristics of the associated feature set. The features may be further grouped according to their classification. For example, FIG. 3A shows an example grouping of original features in a dataset 300. In the example of FIG. 3A, each feature may be classified as a constant feature 301 if each value in the feature set is the same; a quasi-constant feature 302 if a threshold number of values in the feature set are the same; a duplicate feature 303 if the values in the feature set are identical to the values in another feature set; a correlated feature 304 if the values in the feature set are correlated with the values in another feature set; or a remaining feature 305 if the feature set does meet the definition of any special feature. In some implementations, a feature set can meet the definition of two or more special features. In such implementations, the feature set may belong to multiple groups of special features.

In some aspects, the duplicate features 303 may be subdivided into unimportant duplicate features 306 and remaining duplicate features 307. More specifically, only one feature set associated with any duplicated feature may be classified as a remaining duplicate feature 307 while the remaining feature sets are classified as unimportant duplicate features 306. With reference for example to Table 1, if "residence" is classified as a remaining duplicate feature 307, then "location" must be classified as an unimportant duplicate feature 306. In some aspects, the correlated features 304 may be further subdivided into less important correlated features 308 and remaining correlated features 309. Whether a feature set is classified as a less important correlated feature 308 or a remaining correlated feature 309 depends on the contribution of the feature set to the performance of a machine learning model. For example, features associated with a ROC AUC scores equal to or above a threshold score may be classified as remaining correlated features 309. On the other hand, features associated with ROC AUC scores below the threshold score may be classified as less important correlated features 308.

Figure 3B:
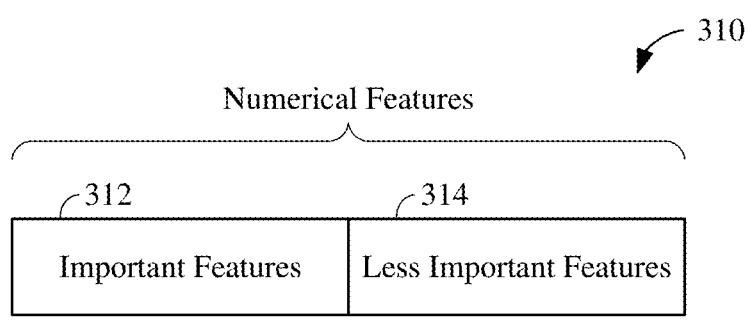
FIG. 3B shows an example grouping of numerical features in a dataset, according to some implementations.

Aspects of the present disclosure recognize that additional analyses may be performed on any numerical feature sets in the input dataset. For example, the performance of a machine learning model applied to a numerical feature set may be evaluated based on a ROC AUC score. As described above, the ROC AUC score may indicate an importance of the feature to the performance of the machine learning model. In some implementations, the feature pruning engine 150 may further classify each numerical feature in the dataset based on its level of importance. FIG. 3B shows an example grouping of numerical features 310 in a dataset, according to some implementations. In the example of FIG. 3B, each feature may be classified as an important feature 312 if the ROC AUC score associated with the feature set exceeds a threshold score, or a less important feature 314 if the ROC AUC score associated with the feature set is below the threshold score.

Figure 4:
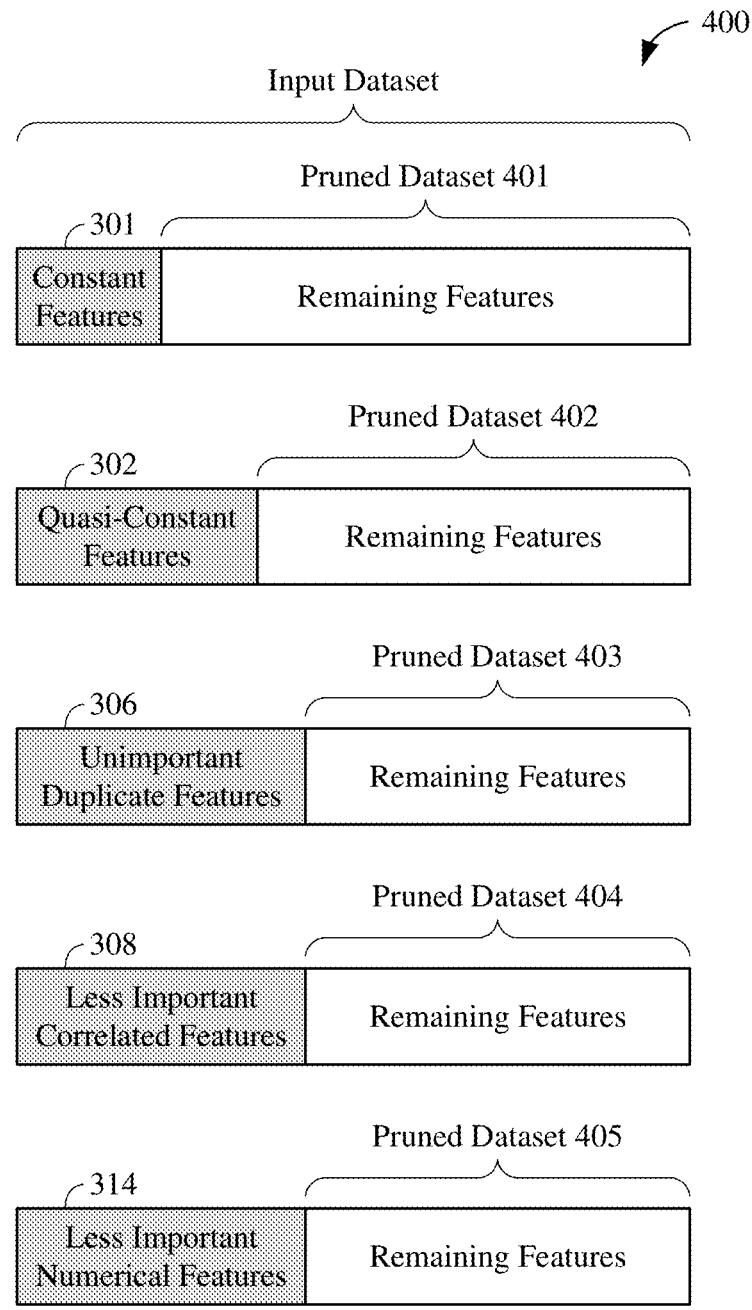
FIG. 4 shows an example pruning of an input dataset for evaluation, according to some implementations.

At block 206, one or more pruned datasets are generated based on the input dataset. In some implementations, the feature pruning engine 150 may generate each of the pruned datasets by removing, from the dataset, any feature sets associated with a respective special feature. FIG. 4 shows an example pruning of an input dataset 400 for evaluation, according to some implementations. In the example of FIG. 4, a first pruned dataset 401 includes the remaining features of the input dataset after removing the constant features 301; a second pruned dataset 402 includes the remaining features of the input dataset after removing the quasi-constant features 302; a third pruned dataset 403 includes the remaining features of the input dataset after removing the unimportant duplicate features 306; a fourth pruned dataset 404 includes the remaining features of the input dataset after removing the less important correlated features 308; and a fifth pruned dataset 405 includes the remaining features of the input dataset after removing the less important numerical features 314.

Figure 5:
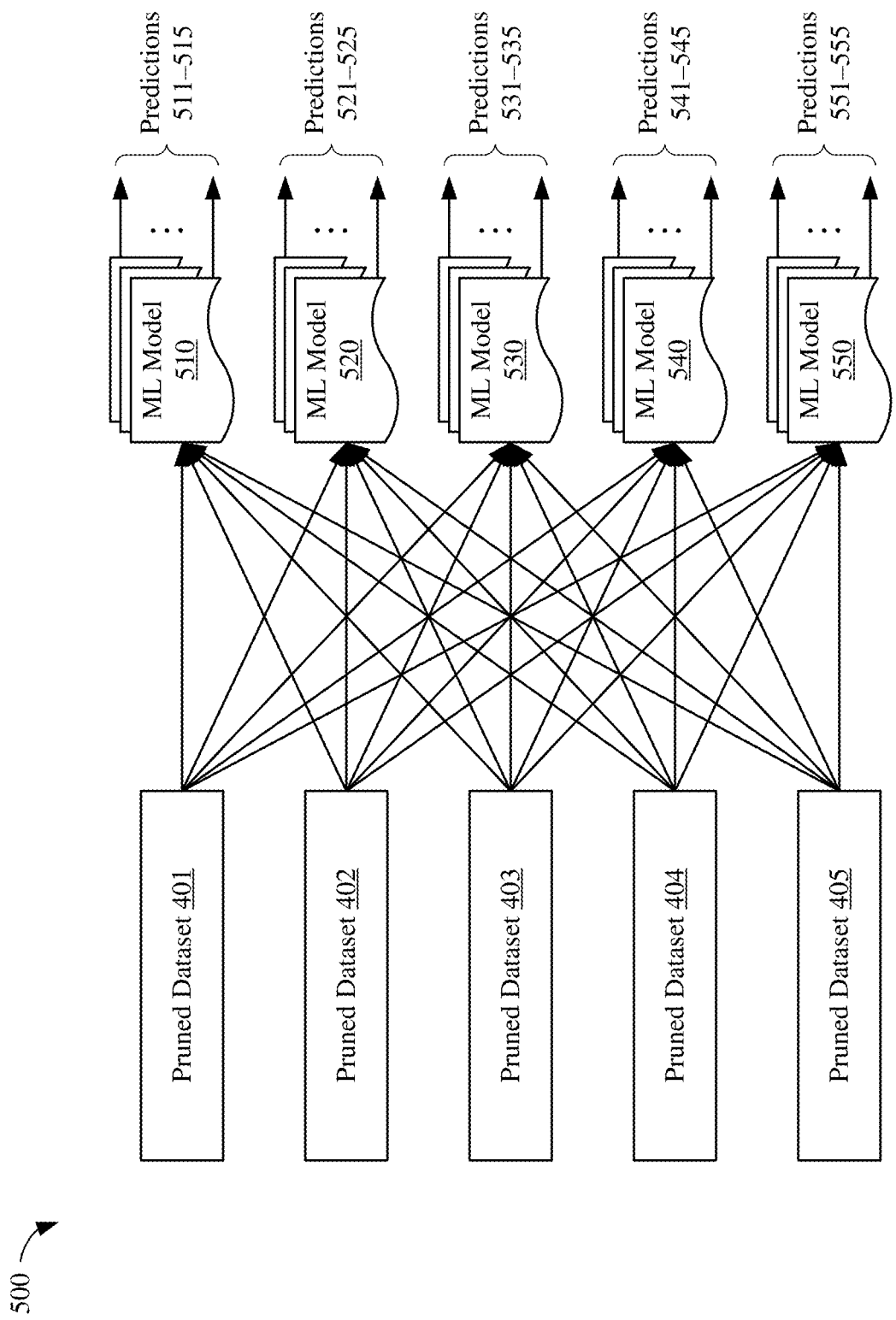
FIG. 5 shows an example mapping of pruned datasets based on multiple machine learning models, according to some implementations.

At block 208, each of the pruned datasets is mapped to one or more predictions using one or more machine learning models. In some implementations, the model evaluation engine 160 may map each of the pruned datasets to multiple sets of predictions based on multiple machine learning models 214, respectively. FIG. 5 shows an example mapping 500 of pruned datasets 401-405 based on multiple machine learning (ML) models 510-550. In the example of FIG. 5, each of the ML models 510-550 may implement a different machine learning algorithm. Although 5 ML models are shown in FIG. 5, the pruned datasets 401-405 may be mapped to fewer or more ML models in actual implementations. Each of the pruned datasets 401-405 may be provided as inputs to each of the ML models 510-550. For example, the first ML model 510 maps the pruned datasets 401-405 to predictions 511-515, respectively; the second ML model 520 maps the pruned datasets 401-405 to predictions 521-525, respectively; the third ML model 530 maps the pruned datasets 401-405 to predictions 531-535, respectively; the fourth ML model 540 maps the pruned datasets 401-405 to predictions 541-545, respectively; and the fifth ML model 550 maps the pruned datasets 401-405 to predictions 551-555, respectively.

At block 210, the results of the mappings are evaluated. In some implementations, the model evaluation engine 160 may evaluate the predictions inferred by each of the machine learning models according to one or more evaluation metrics. Example suitable evaluation metrics include, but are not limited to, precision, recall, F1 score, and ROC AUC. In some aspects, the model evaluation engine 160 may determine a performance score associated with each set of predictions output by the machine learning models. With reference for example to FIG. 5, the model evaluation engine 160 may determine a respective set of performance scores (such as a precision score, a recall score, an F1 score, and a ROC AUC score) for each of the predictions 511-515, 521-525, 531-535, 541-545, and 551-555. Each set of performance scores indicates an importance of a pruned dataset to the training of a machine learning model and a performance of a machine learning algorithm implemented by the machine learning model. For example, the performance score associated with the predictions 511 may indicate an importance of the pruned dataset 401 and a performance of the machine learning algorithm implemented by the ML model 510.

At block 212, one or more training parameters are configured based on the evaluation of each mapping. In some implementations, the one or more training parameters may include an optimal machine learning algorithm 218 to be used to train a new machine learning model. For example, the model evaluation engine 160 may compare the performance scores associated with each of the machine learning models to determine which of the machine learning models produced the highest overall performance scores (or the highest performance score according to a particular evaluation metric). With reference for example to FIG. 5, the model evaluation engine 160 may compare the performance scores associated with predictions 511-515, the performance scores associated with predictions 521-525, the performance scores associated with predictions 531-535, the performance scores associated with predictions 541-545, and the performance scores associated with the predictions 551-555 with one another to determine which of the ML models 510-550 produced the highest overall performance scores. The model evaluation engine 160 may then select the machine learning algorithm implemented by the highest-performing ML model as the optimal machine learning algorithm 218.

In some other implementations, the one or more training parameters may include a pruned input dataset 220 to be used to train a new machine learning model. For example, the model evaluation engine 160 may compare the performance scores associated with each of the pruned datasets to determine which, if any, of the pruned datasets produced performance scores that are higher than respective performance thresholds. With reference for example to FIG. 5, the model evaluation engine 160 may compare the performance scores associated with predictions 511, 521, 531, 541, and 551, the performance scores associated with predictions 512, 522, 532, 542, and 552, the performance scores associated with predictions 513, 523, 533, 543, and 553, the performance scores associated with predictions 514, 524, 534, 544, and 554, and the performance scores associated with predictions 515, 525, 535, 545, and 555 with one or more performance thresholds to determine whether any of the pruned datasets 401-405 produced performance scores that are above the respective performance thresholds.

Figure 6:
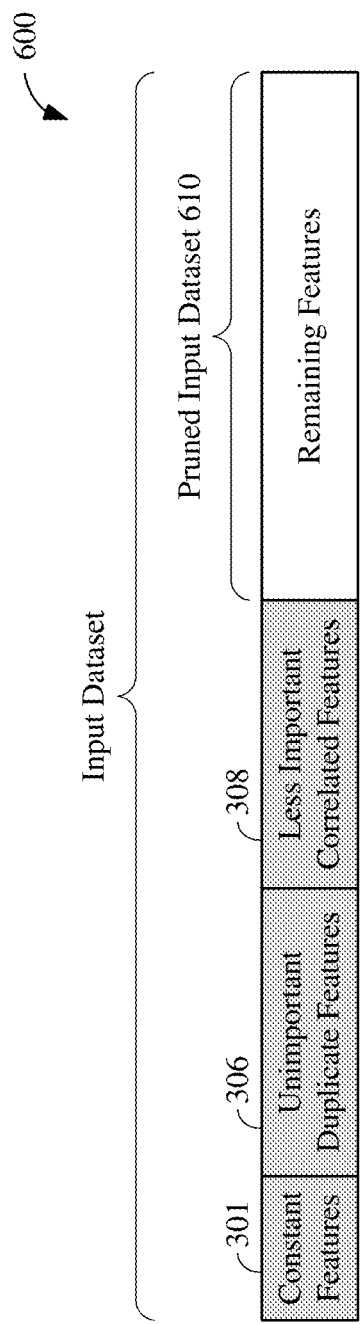
FIG. 6 shows an example pruning of an input dataset to be used for training a machine learning model, according to some implementations.

The model evaluation engine 160 may identify the special features associated with any pruned datasets that produced performance scores above the performance thresholds and remove the feature sets associated with the identified special features from the input dataset. With reference for example to FIGS. 4 and 5, the model evaluation engine 160 may determine that the pruned datasets 401, 403, and 404 produced performance scores that are equal to or above respective performance thresholds. Accordingly, the model evaluation engine 160 may remove the feature sets associated with the constant features 301, the unimportant duplicate features 306, and the less important correlated features 308 from the input dataset. FIG. 6 shows an example pruning of an input dataset 600 to be used for training a machine learning model. In the example of FIG. 6, the pruned input dataset 610 includes only the remaining features of the input dataset after the constant features 301, the unimportant duplicate features 306, and the less important correlated features 308 are removed.

Figure 7:
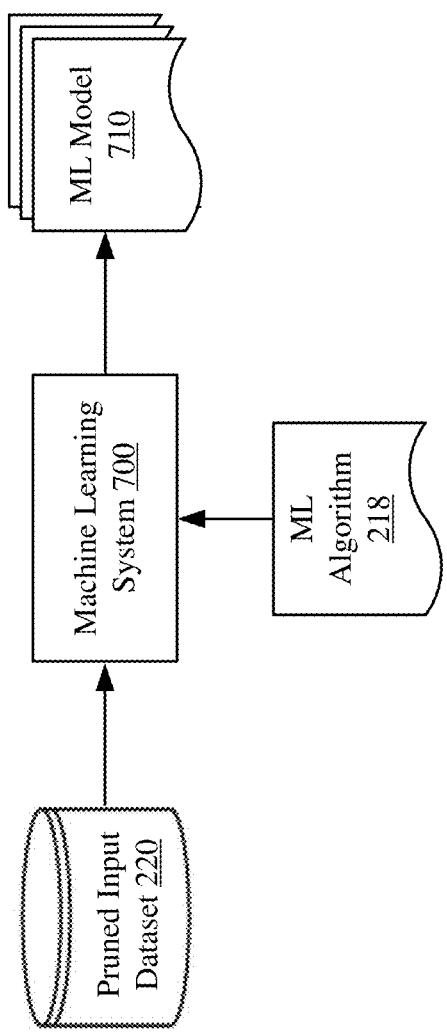
FIG. 7 shows an example machine learning system, according to some implementations.

FIG. 7 shows an example machine learning system 700, according to some implementations. In some implementations, the machine learning system 700 may be used for training an ML model 710 based on the ML algorithm 218 and the pruned input dataset 220 produced by the pre-processing system 100. For example, during training, the machine learning system 700 may analyze the pruned input dataset 220 in accordance with the ML algorithm 218 to learn a set of rules (corresponding to the ML model 710) that can be used to infer one or more predictions based on new data values. In one example, the ML model 710 may be trained to predict a potential car buyer's preference for electric cars. With reference for example to Table 1, the pruned input dataset 220 may include only a subset of the values of the original input dataset. For example, the pruned input dataset 220 may include only the feature sets associate with the "name," "age," "gender," "residence," and "EV" features. Thus, by pruning the input dataset, the pre-processing system 100 may significantly reduce the time and resources required by the machine learning system 700 to train the ML model 710. The reduction in size of the input dataset further results in an ML model 710 that is more accurate and smaller and more efficient to deploy. Because the ML algorithm 218 has been determined to be optimal for the given application, the pre-processing system 100 also may improve the performance of the ML model 710.

Figure 8:
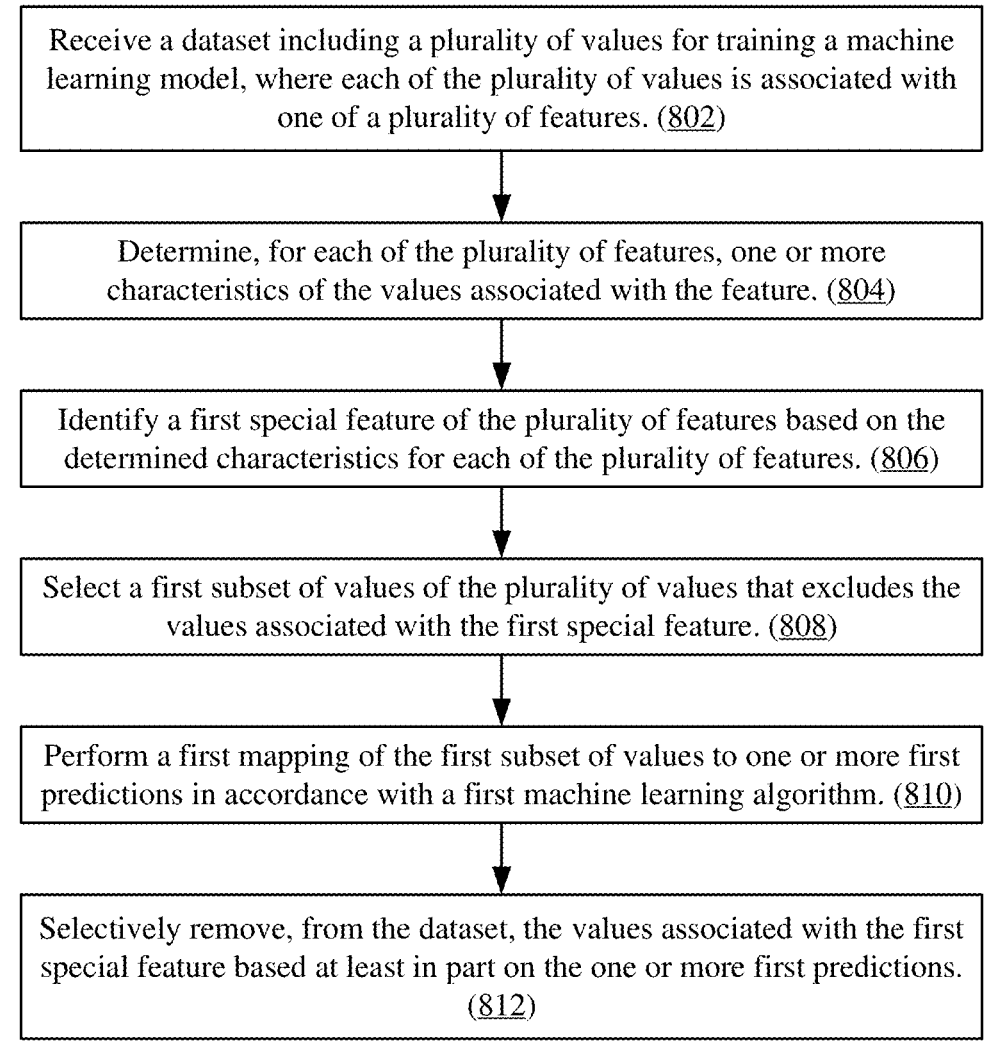
FIG. 8 shows an illustrative flowchart depicting an example machine learning operation, according to some implementations.

FIG. 8 shows an illustrative flowchart depicting an example machine learning operation 800, according to some implementations. The example operation 800 may be performed by one or more processors of a pre-processing system for machine learning. In some implementations, the example operation 800 may be performed using the pre-processing system 100 of FIG. 1. However, it is to be understood that the example operation 800 may be performed by other suitable systems, computers, or servers.

At block 802, the pre-processing system 100 receives a dataset including a plurality of values for training a machine learning model, where each of the plurality of values is associated with one of a plurality of features. At block 804, the pre-processing system 100 determines, for each of the plurality of features, one or more characteristics of the values associated with the feature. For example, the one or more characteristics may include a data type, a number of non-null values, a number of distinct values, a predominant value, a number of instances of the predominant value, a standard deviation, a mean value, a minimum value, a maximum value, one or more percentile thresholds, a ROC AUC score, or an XGBoost score. At block 806, the pre-processing system 100 identifies a first special feature of the plurality of features based on the determined characteristics for each of the plurality of features. At block 808, the pre-processing system 100 selects a first subset of values of the plurality of values that excludes the values associated with the first special feature. At block 810, the pre-processing system 100 performs a first mapping of the first subset of values to one or more first predictions in accordance with a first machine learning algorithm. At block 812, the pre-processing system 100 selectively removes, from the dataset, the values associated with the first special feature based at least in part on the one or more first predictions.

In some implementations, the identifying of the first special feature may include identifying a predominant value among the values associated with the first special feature; counting a number of instances of the predominant value among the values associated with the first special feature; and determining that the number of instances is greater than a threshold number. In some other implementations, the identifying of the first special feature may include determining that the values associated with the first special feature are identical to the values associated with one or more of the remaining features of the plurality of features.

In some other implementations, the identifying of the first special feature may include mapping the values associated with the first special feature to one or more second predictions in accordance with the first machine learning algorithm; determining a ROC AUC score based on the one or more second predictions; and determining that the univariate ROC AUC score is lower than a threshold score. Still further, in some implementations, the identifying of the first special feature may include determining an amount of correlation between the values associated with the first special feature and the values associated with the remaining features of the plurality of features and determining that the amount of correlation between the values associated with the first special feature and the values associated with one or more of the remaining features is greater than a threshold amount.

In some implementations, the pre-processing system 100 may further determine one or more first performance scores based on the one or more first predictions, the one or more first performance scores indicating a performance of the first mapping according to one or more evaluation metrics. In some aspects, the selective removing of the values associated with the first special feature may include determining whether the one or more first performance scores exceed one or more respective performance thresholds and removing, from the dataset, the values associated with the first special feature based on determining that the one or more first performance scores exceed the one or more respective performance thresholds.

In some implementations, the pre-processing system 100 may further perform a second mapping of the first subset of values to one or more second predictions in accordance with a second machine learning algorithm; determine one or more second performance scores based on the one or more second predictions, where the one or more second performance scores indicate a performance of the second mapping according to the one or more evaluation metrics; compare the one or more first performance scores with the one or more second performance scores; and train the machine learning model in accordance with the first machine learning algorithm or the second machine learning algorithm based on the comparison of the first performance scores with the second performance scores.

In some implementations, the pre-processing system 100 may further identify a second special feature of the plurality of features based on the determined statistics for each of the plurality of features; select a second subset of values of the plurality of values that excludes the values associated with the second special feature; perform a second mapping of the second subset of values to one or more second predictions in accordance with the first machine learning algorithm; and selectively remove, from the dataset, the values associated with the second special feature based at least in part on the one or more second predictions.

Figure 9:
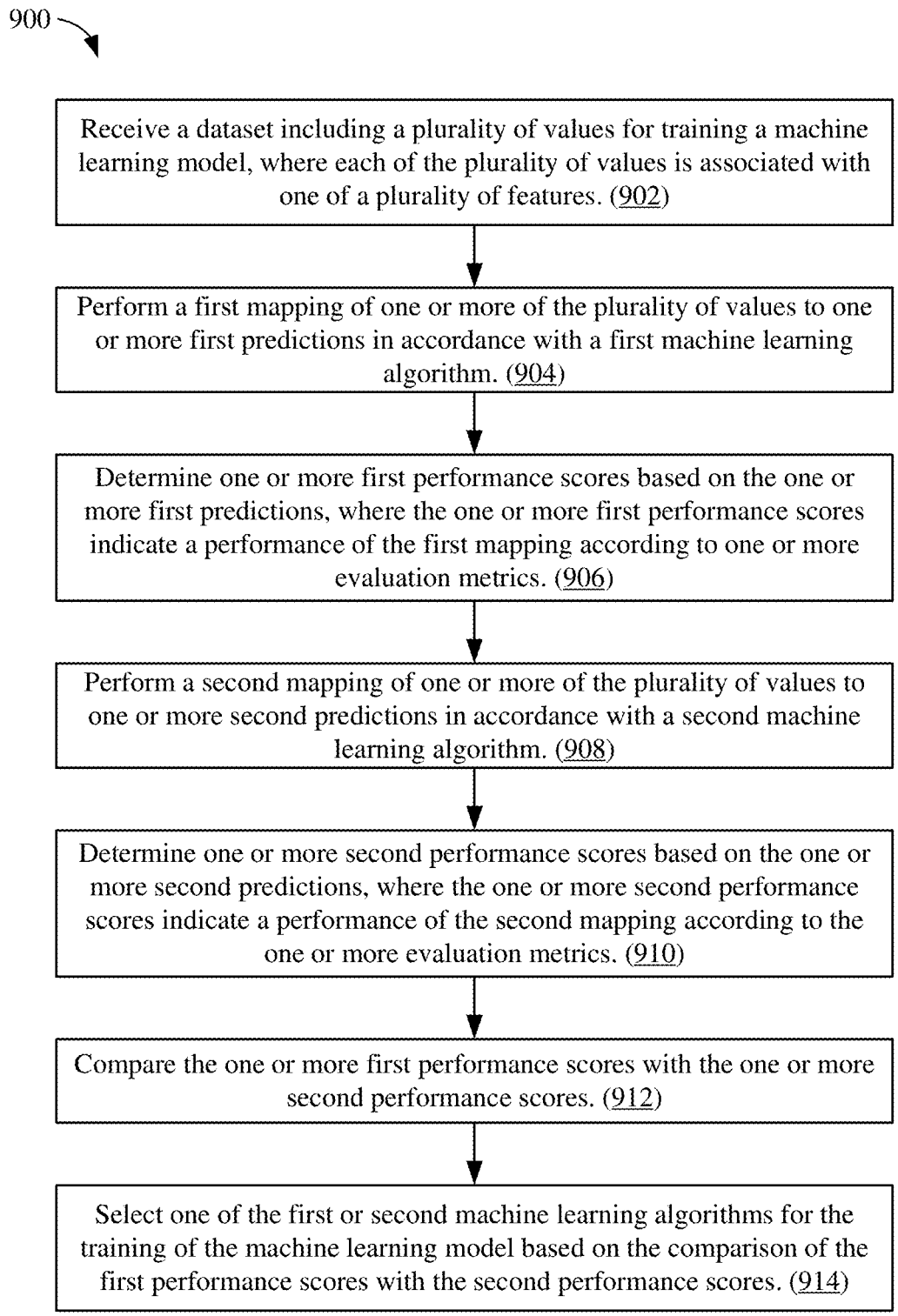
FIG. 9 shows another illustrative flowchart depicting an example machine learning operation, according to some implementations.

FIG. 9 shows another illustrative flowchart depicting an example machine learning operation, according to some implementations. The example operation 900 may be performed by one or more processors of a machine learning system. In some implementations, the example operation 900 may be performed using the pre-processing system 100 of FIG. 1. However, it is to be understood that the example operation 900 may be performed by other suitable systems, computers, or servers.

At block 902, the pre-processing system 100 receives a dataset including a plurality of values for training a machine learning model, where each of the plurality of values is associated with one of a plurality of features. At block 904, the pre-processing system 100 performs a first mapping of one or more of the plurality of values to one or more first predictions in accordance with a first machine learning algorithm. At block 906, the pre-processing system 100 determines one or more first performance scores based on the one or more first predictions, where the one or more first performance scores indicate a performance of the first mapping according to one or more evaluation metrics. At block 908, the pre-processing system 100 performs a second mapping of one or more of the plurality of values to one or more second predictions in accordance with a second machine learning algorithm. At block 910, the pre-processing system 100 determines one or more second performance scores based on the one or more second predictions, where the one or more second performance scores indicate a performance of the second mapping according to the one or more evaluation metrics. At block 912, the pre-processing system 100 compares the one or more first performance scores with the one or more second performance scores. At block 914, the pre-processing system 100 selects one of the first or second machine learning algorithms for the training of the machine learning model based on the comparison of the first performance scores with the second performance scores.

In some implementations, the pre-processing system 100 may further determine, for each of the plurality of features, one or more characteristics of the values associated with the feature; identify a special feature of the plurality of features based on the determined characteristics for each of the plurality of features; and select a subset of values of the plurality of values that excludes the values associated with the special feature, where the subset includes the one or more values. In some implementations, the pre-processing system 100 may further selectively remove, from the dataset, the values associated with the special feature based at least in part on the one or more first predictions or the one or more second predictions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A computer-implemented method of pruning features for training a machine learning model, the method performed by one or more processors of a pre-processing system and comprising:
    receiving a dataset including a plurality of values for training a machine learning model, each of the plurality of values being associated with one of a plurality of features;
    determining, for each of the plurality of features, one or more characteristics of the values associated with the feature;
    identifying one or more less important features of the plurality of features based on the determined characteristics for each of the plurality of features, each less important feature including at least one of a constant feature, a quasi-constant feature, a duplicate feature, a correlated feature, or another feature deemed less important based on a numerical evaluation of its contribution to a predictive performance of the machine learning model;
    generating, for each respective less important feature, a pruned dataset including a subset of values selected from the plurality of values, the selected subset of values excluding the values associated with the respective less important feature;
    performing, for each pruned dataset generated, a mapping of the pruned dataset to one or more first predictions in accordance with a first machine learning algorithm;
    determining, for each mapping performed, a performance level of the mapping based at least in part on one or more evaluation metrics;
    selectively removing, from the dataset, the values associated with ones of the less important features based at least in part on a comparison of each determined performance level with a threshold performance level; and
    generating a reduced dataset for training, using the first machine learning algorithm, the machine learning model, the reduced dataset including remaining values of the dataset after the values associated with the ones of the less important features are selectively removed.

2. The method of claim 1, wherein the one or more characteristics include at least one of a data type, a number of non-null values, a number of distinct values, a predominant value, a number of instances of the predominant value, a standard deviation, a mean value, a minimum value, a maximum value, one or more percentile thresholds, a receiver operating characteristic (ROC) area under curve (AUC) score, or an extreme gradient boosting (XGBoost) score.

3. The method of claim 1, wherein the identifying of each respective less important feature comprises:
    identifying a predominant value among the values associated with the respective less important feature;
    counting a number of instances of the predominant value among the values associated with the respective less important feature; and
    determining that the number of instances is greater than a threshold number.

4. The method of claim 1, wherein the identifying of each respective less important feature comprises:
    determining that the values associated with the respective less important feature are identical to the values associated with one or more remaining features of the plurality of features.

5. The method of claim 1, wherein the identifying of each respective less important feature comprises:
    mapping the values associated with the respective less important feature to one or more second predictions in accordance with the first machine learning algorithm;
    determining a ROC AUC score based on the one or more second predictions; and
    determining that the univariate ROC AUC score is lower than a threshold score.

6. The method of claim 1, wherein the identifying of each respective less important feature comprises:
    determining an amount of correlation between the values associated with the respective less important feature and the values associated with remaining features of the plurality of features; and
    determining that the amount of correlation between the values associated with the respective less important feature and the values associated with one or more of the remaining features is greater than a threshold amount.

7. The method of claim 1, wherein determining the performance level of each mapping includes:
    determining one or more first performance scores based on the one or more first predictions, the one or more first performance scores indicating the performance level of the mapping according to the one or more evaluation metrics.

8. The method of claim 7, wherein the selective removing of the values associated with the ones of the less important features comprises:
    determining whether the one or more first performance scores associated with a corresponding less important feature exceed one or more respective performance thresholds; and removing, from the dataset, the values associated with the corresponding less important feature based on determining that the one or more first performance scores exceed the one or more respective performance thresholds.

9. The method of claim 7, further comprising:
performing a second mapping of the pruned datasets to one or more second predictions in accordance with a second machine learning algorithm;
determining one or more second performance scores based on the one or more second predictions, the one or more second performance scores indicating a performance of the second mapping according to the one or more evaluation metrics;
comparing the one or more first performance scores with the one or more second performance scores; and
training the machine learning model in accordance with the first machine learning algorithm or the second machine learning algorithm based on the comparison of the first performance scores with the second performance scores.

10. The method of claim 1, further comprising:
identifying an additional less important feature of the plurality of features based on the determined statistics for each of the plurality of features;
selecting a second subset of values of the plurality of values that excludes the values associated with the additional less important feature;
performing a second mapping of the second subset of values to one or more second predictions in accordance with the first machine learning algorithm; and
selectively removing, from the dataset, the values associated with the additional less important feature based at least in part on the one or more second predictions.

11. A pre-processing system for pruning features for training a machine learning model, comprising:
one or more processors; and
a memory storing instructions that, when executed by the one or more processors, causes the pre-processing system to perform operations including:
receiving a dataset including a plurality of values for training a machine learning model, each of the plurality of values being associated with one of a plurality of features;
determining, for each of the plurality of features, one or more characteristics of the values associated with the feature;
identifying one or more less important features of the plurality of features based on the determined characteristics for each of the plurality of features, each less important feature including at least one of a constant feature, a quasi-constant feature, a duplicate feature, a correlated feature, or another feature deemed less important based on a numerical evaluation of its contribution to a predictive performance of the machine learning model;
generating, for each respective less important feature, a pruned dataset including a subset of values selected from the plurality of values, the selected subset of values excluding the values associated with the respective less important feature;
performing, for each pruned dataset generated, a mapping of the pruned dataset to one or more first predictions in accordance with a first machine learning algorithm;
determining, for each mapping performed, a performance level of the mapping based at least in part on one or more evaluation metrics;
selectively removing, from the dataset, the values associated with ones of the less important features based at least in part on a comparison of each determined performance level with a threshold performance level; and
generating a reduced dataset for training, using the first machine learning algorithm, the machine learning model, the reduced dataset including remaining values of the dataset after the values associated with the ones of the less important features are selectively removed.

12. The pre-processing system of claim 11, wherein execution of the instructions for identifying each respective less important feature causes the pre-processing system to perform operations further comprising:
identifying a predominant value among the values associated with the respective less important feature;
counting a number of instances of the predominant value among the values associated with the respective less important feature; and
determining that the number of instances is greater than a threshold number.

13. The pre-processing system of claim 11, wherein execution of the instructions for identifying each respective less important feature causes the pre-processing system to perform operations further comprising:
determining that the values associated with the respective less important feature are identical to the values associated with one or more remaining features of the plurality of features.

14. The pre-processing system of claim 11, wherein execution of the instructions for identifying each respective less important feature causes the pre-processing system to perform operations further comprising:
mapping the values associated with the respective less important feature to one or more second predictions in accordance with the first machine learning algorithm;
determining a receiver operating characteristic (ROC) area under curve (AUC) score based on the one or more second predictions; and
determining that the univariate ROC AUC score is lower than a threshold score.

15. The pre-processing system of claim 11, wherein execution of the instructions for identifying each respective less important feature causes the pre-processing system to perform operations further comprising:
determining an amount of correlation between the values associated with the respective less important feature and the values associated with remaining features of the plurality of features; and
determining that the amount of correlation between the values associated with the respective less important feature and the values associated with one or more of the remaining features is greater than a threshold amount.

16. The pre-processing system of claim 11, wherein execution of the instructions for selectively removing the values associated with the ones of the less important features causes the pre-processing system to perform operations further comprising:
determining one or more first performance scores based on the one or more first predictions, the one or more first performance scores indicating the performance level of the mapping according to the one or more evaluation metrics;

determining whether the one or more first performance scores associated with a corresponding less important feature exceed one or more respective performance thresholds; and removing, from the dataset, the values associated with the corresponding less important feature based on determining that the one or more first performance scores exceed the one or more respective performance thresholds.

17. The pre-processing system of claim 11, wherein execution of the instructions further causes the pre-processing system to perform operations comprising:

identifying an additional less important feature of the plurality of features based on the determined statistics for each of the plurality of features;

selecting a second subset of values of the plurality of values that excludes the values associated with the additional less important feature;

performing a second mapping of the second subset of values to one or more second predictions in accordance with the first machine learning algorithm; and selectively removing, from the dataset, the values associated with the additional less important feature based at least in part on the one or more second predictions.

18. A computer-implemented method of selecting a machine learning algorithm for training a machine learning model, the method performed by one or more processors of a pre-processing system and comprising:

receiving a dataset including a plurality of values for training a machine learning model, each of the plurality of values being associated with one of a plurality of features;

determining, for each of the plurality of features, one or more characteristics of the values associated with the feature;

identifying a less important feature of the plurality of features based on the determined characteristics for each of the plurality of features;

selectively removing, from the dataset, the values associated with the less important feature;

generating, for the less important feature, a pruned dataset including a subset of values selected from the plurality of values, the subset excluding the values associated with the less important feature;

performing a first mapping of one or more of the subset of values to one or more first predictions in accordance with a first machine learning algorithm;

determining one or more first performance scores based on the one or more first predictions, the one or more first performance scores indicating a performance of the first mapping according to one or more evaluation metrics;

performing a second mapping of the subset of values to one or more second predictions in accordance with a second machine learning algorithm;

determining one or more second performance scores based on the one or more second predictions, the one or more second performance scores indicating a performance of the second mapping according to the one or more evaluation metrics;

comparing the one or more first performance scores with the one or more second performance scores; and selecting one of the first or second machine learning algorithms for the training of the machine learning model based on the comparison of the first performance scores with the second performance scores.

* * * * *